March 20, 1928.  
A. C. ANDERSON  
1,663,186  
FLUID CLUTCH AND REVERSE GEAR  
Filed July 21 1926  
3 Sheets-Sheet 1

Inventor
Alfred C. Anderson.
By Attorneys

March 20, 1928.

A. C. ANDERSON 1,663,186

FLUID CLUTCH AND REVERSE GEAR

Filed July 21 1926

Inventor
Alfred C. Anderson
By Attorneys

March 20, 1928.

A. C. ANDERSON

FLUID CLUTCH AND REVERSE GEAR

Filed July 21 1926

Inventor
Alfred C. Anderson,
By Attorneys

Patented Mar. 20, 1928.

1,663,186

UNITED STATES PATENT OFFICE.

ALFRED C. ANDERSON, OF WORCESTER, MASSACHUSETTS.

FLUID CLUTCH AND REVERSE GEAR.

Application filed July 21, 1926. Serial No. 124,073.

This invention relates to a driving means for an automobile or other machine. The principal objects of the invention are to provide a speed changing device and clutch without using the usual speed change gears; to provide a construction in which the power is transmitted through an oil clutch when the car or machine is running at high gear or at normal speed; and to provide in connection therewith a brake device which will reverse the transmission of the power.

Other objects of the invention are to provide a cruciform member comprising pistons and cylinders working in oil and operating eccentrically and to provide them with tapered passages for permitting the concentration of the pressure at the proper point and with a four-way valve to control the amount of fluid passing from cylinder to cylinder and having ports of special shape to prevent too sudden closure. The invention also involves an operating means for reducing the speed in connection with the four pistons and cylinders and the valve, preferably comprising a flanged helical ring gear adapted to be moved on its own axis by the operating lever and co-operating with two helical pinions always in mesh therewith which will revolve and operate the above mentioned valve for controlling the speed of transmission. The invention also involves the provision of means whereby the said cylinders and pistons or cruciform construction is located in a casing filled with oil or other lubricant, and to provide sensitive valves which open automatically when the pressure is reduced inside the cylinders to admit oil thereto. This provides means whereby when the fluid in the cylinder under pressure tends to reduce in volume through leakage passing by the piston rings, a vacuum is created in the cylinder and pressure is also set up in the casing outside the cylinders so that the oil will be pushed into the cylinders through said valves. I also provide means for transmitting the power from the construction above mentioned which is connected with the fly wheel to an eccentric bored convertor or shaft and from that to the driven shaft through a series of gears which maintain a stationary relation to each other during the normal driving. This combination reduces the loss by friction between the pistons and cylinders. The convertor serves three purposes; first, to revolve freely in the casing when idling; second, to act as a crank pin when the rotary fluid valves are closing gradually in the pistons at will and vice-versa; and third, as an idler gear support which is held stationary with a brake-band to give a reverse motion to the driven shaft, the rotary valves being open. This reversing mechanism operated by a brake-band is also a feature of this invention.

Other objects and advantages of this invention will appear hereinafter.

Reference is to be had to the accompanying drawings in which

Figure 1:
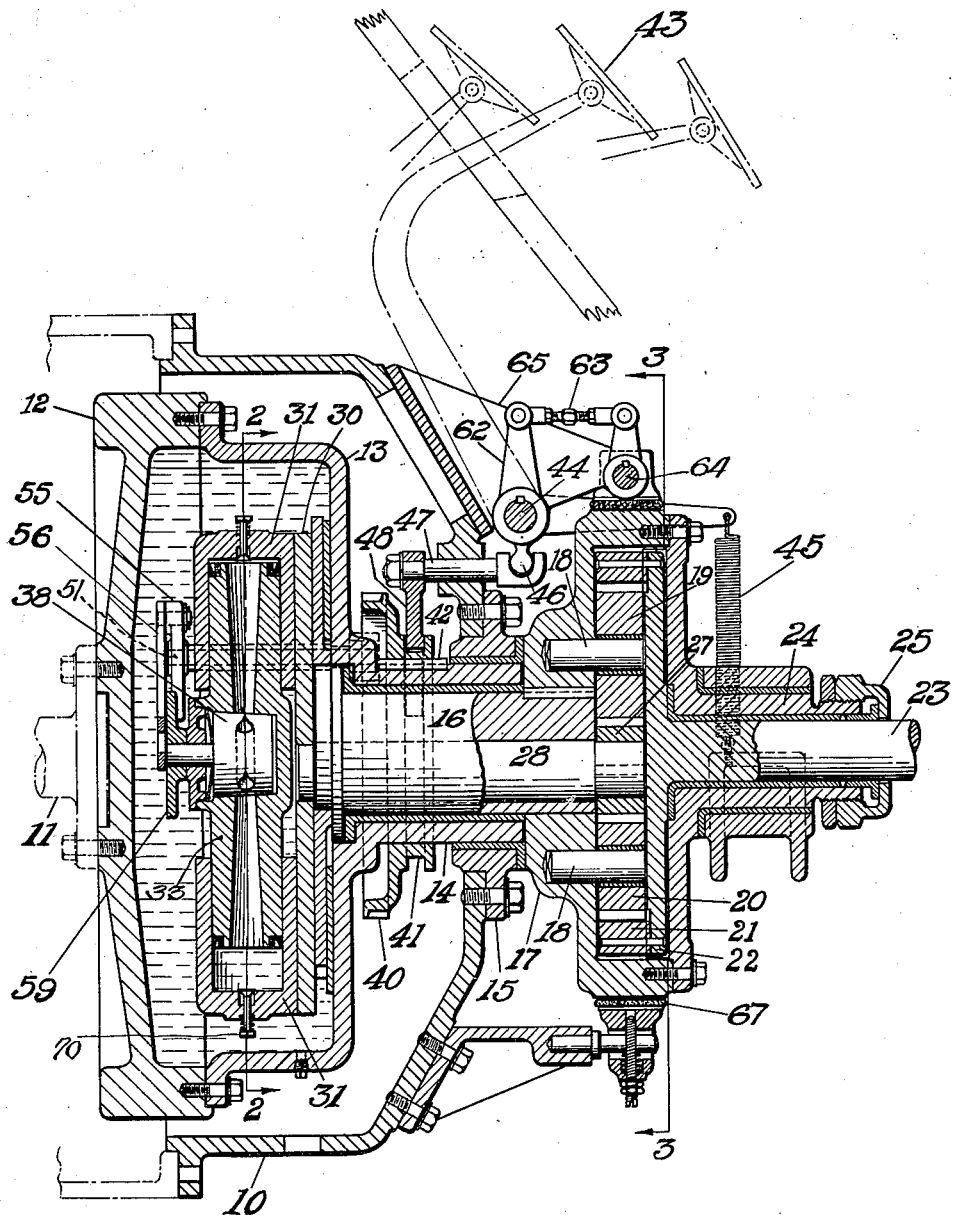
Fig. 1 is a central sectional view throughout the entire device.

This invention is capable of general use for transmitting power were different speeds are desired and also where it is desired to reverse the direction of drive, but I have shown it as applied to an automobile having a housing 10 which encloses the main part of the device. The motor shaft 11 is provided with a fly wheel 12 on which is bolted a casing 13 which, of course, rotates constantly with the motor shaft. This casing is provided with a hollow cylindrical end 14 which rests in a bearing 15 on the housing 10, being provided with a bushing for that purpose. The casing 13 and fly wheel 12 are secured together with sufficient tightness to prevent the leakage of oil and this casing is filled full of lubricating oil. These parts, of course, rotate on the axis of the motor shaft. The hollow projection 14 is provided with a bushing in which rotates a shaft or convertor 16. This shaft is keyed to a housing 17 which is provided with two or more studs 18. On these two studs are gears 19 and 20 which are of different sizes and both mesh with an internal gear 21 riveted to a plate 22 which is fixed to the driven shaft 23 and is concentric with it. This shaft is mounted in a bearing 24 provided with a stuffing box 25 which do not constitute a part of this invention.

Between the gears 19 and 20 is a pinion 27 which is fixed on a shaft 28 that has its bearing through the shaft 16 and is eccentrically mounted thereon. It will be seen therefore, that the three gears 19, 20 and 27 meshing on the outside with the internal gear 21, act as keys in the ordinary driving of the device to drive the driven shaft 23 at the same speed as the shaft 16 by the rotation of the shaft 28 therein, around the axis of the shaft 16 and the shaft 23.

The shaft 28 is welded to a plate 30 inside the casing 13. On this plate there are two cylinders 31 opposite each other and doweled, or otherwise fixed, to the plate 30. They rotate with this plate 30 and are not movable with respect to it. Mounted on an axis at right angles to the axis of the two cylinders 31, are cylinders 32 which are like them but are doweled, or otherwise secured, to the casing 13 and thus they rotate positively with the fly wheel. It will be seen, therefore, that there are four cylinders rotatable about an axis and two of them shiftable radially together on account of the eccentricity of the bearing of the shaft 28.

Figure 2:
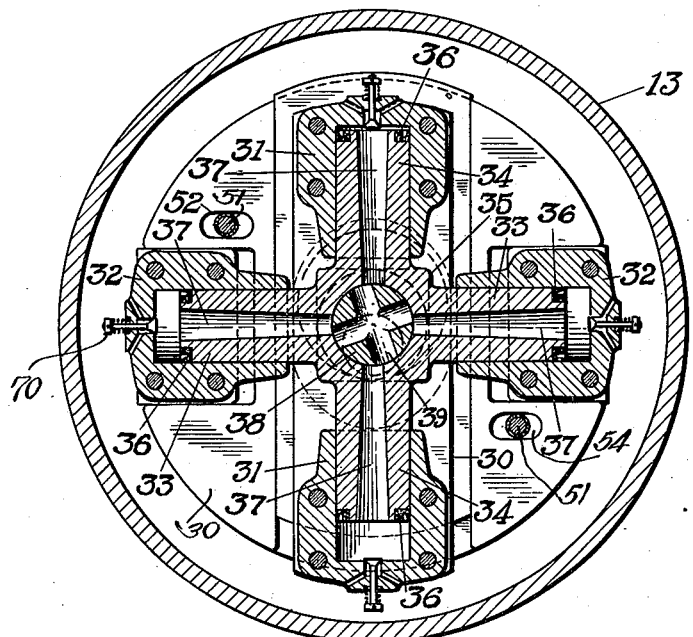
Fig. 2 is substantially a sectional view on the line 2—2 of Fig. 1.
Figure 3:
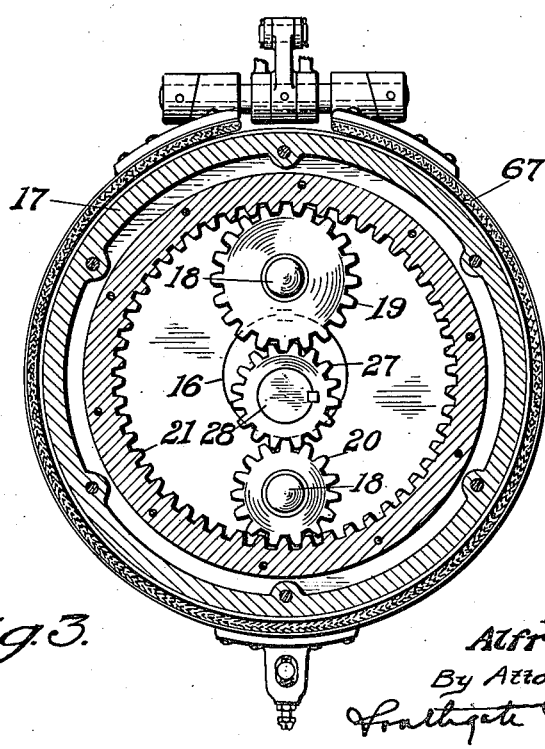
Fig. 3 is a transverse sectional view on the line 3—3 of Fig. 1.
Figure 6:
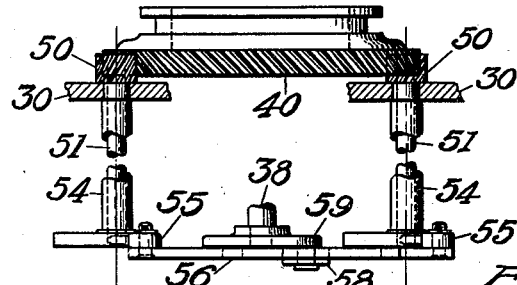
Fig. 6 is a skeleton plan, with parts omitted, showing the operation of the valve for the cruciform construction by means of the slidable spiral gear.

The cylinders are all in the same plane transverse to the axis of the various shafts mentioned and they are provided with two sets of pistons 33 and 34 connected together by a hub 35 and constituting a single unitary cruciform construction. These pistons are provided with packing or piston rings 36 for preventing leakage as much as possible. They are also provided with tapered passages 37 extending radially and gradually decreasing in size from the ends of the pistons to the center of the construction. At the center is located a circular valve 38 having cross ports 39 in communication with each other and as shown in Fig. 1 especially, and with the passages 37. These ports have a special shape, wide on one side and the sides concave and converging to a point at the other. When these ports are in full registration with the tapered passages 37 there is no obstruction to the flow of the oil. But when the valve turns away from that position in a clockwise direction in Fig. 2 the flow of the oil, just before complete closing, is not cut off suddenly.

For the purpose of operating the valve 38, I use a slidable spiral flanged gear 40. This has a collar 41 and is shiftable along a key 42 carried by the end 14 of the casing 13.

The foot pedal 43 in the present case is pivoted on a shaft 44 and provided with the usual spring 45 for holding it up and with a rounded projection 46 which operates a rod 47 to move it longitudinally. This rod is provided with a yoke 48 engaging the collar 41 for shifting the flanged gear 40. This spiral gear, when shifted from the normal running position, will operate a pair of spiral pinions 50. Each one of these is fixed on a shaft 51 which extends through the balancing plate 30 and casing 13 which is provided with a pair of hollow tubes 54. The plate 30 is provided with slots 52 for permitting the same. These shaft are connected with a pair of counterbalanced levers 55 which are connected by a link 56 in such relations that the two levers will always maintain a parallel relation with each other. They are both turned together so as to shift this link 56 longitudinally. This link is provided with a slot 57 to permit of this motion and in this slot is a slide 58 which is caused to move with the link. This slide is provided with a pin connected with a crank disc 59 on the valve 38 for turning this valve on its own axis. Thus the valve is controlled and operated.

It will be noticed that the shaft 44 has an arm 62 extending upwardly therefrom and an adjustable link 63 for operating a shaft 64 when the pedal 43 is depressed. This shaft is mounted on a bracket 65 and is provided with means for applying a brake 67 to the surface of the housing 17 which is positively connected as stated with the shaft 16 and plate 24 which has the bearing for the driven shaft.

In the operation of the device, when the foot pedal is in neutral or pushed down, the gear 40, which is in mesh with the pinions 50 slides and the power is transmitted from the shaft 11 through the fly wheel 12, casing 13, and its projections 14 to rotate these parts, of course, at the speed of the engine. The two cylinders 32 which are fixed to the casing 13 necessitate the rotation of the cruciform construction at the same speed. As these parts have to rotate together, the plate 30 is rotated by the two cylinders 31, and therefore, the shaft 28, which is fixed positively to this plate, rotates with them. The shafts 16 and 28 are never at rest as long as the fly wheel 12 is in motion, no matter whether idling or loaded. The shaft 28 is a driven shaft, rotated positively by the fly wheel at all times and at the same speed. The mechanical connection between these two parts absolutely insures this action. The shaft 28 rotates as a whole about the axis of the shaft 16 and therefore, the cylinders 31 shift radially as they rotate about its axis. This causes the oil to pass back and forth through the passages 37 and valve 38, which is in its open position, of course, at this time and furnishes no resistance to this motion. The rotation of the shaft 28 about the axis of the shaft 16, of course, carries the pinion 27 with it in the same way. This pinion meshing with the two gears 19 and 20 having different numbers of teeth and both meshing with the internal gear 21, causes this gear to rotate exactly with the pinion 27. As the gears 19 and 20 are fixed to the housing 17 and as the gear 21 is fixed to the plate 22, these parts rotate positively with the shaft 28 and the driven shaft 23 is driven at the desired speed.

Figure 4:
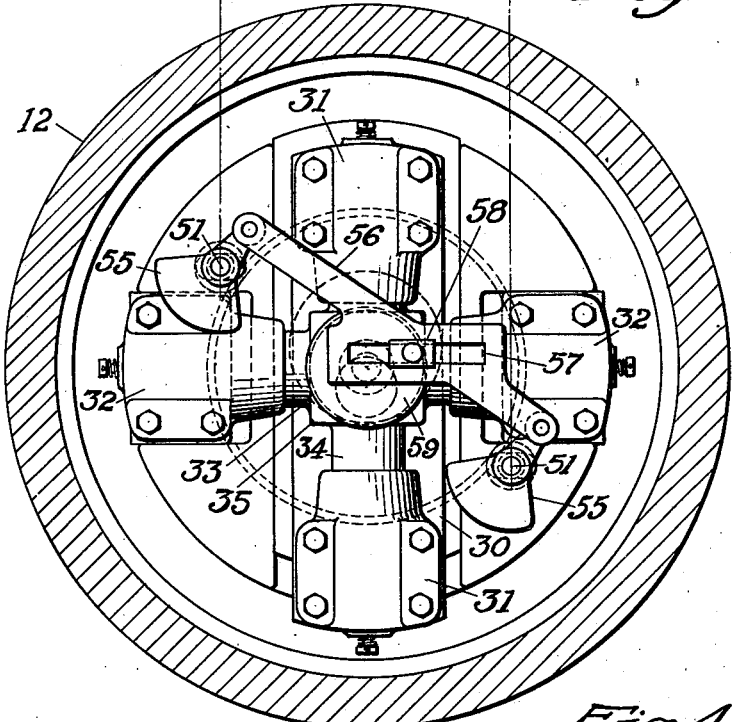
Fig. 4 is an end view of the cruciform piston and cylinder construction showing the valve operating means but with the housing in section.
Figure 5:
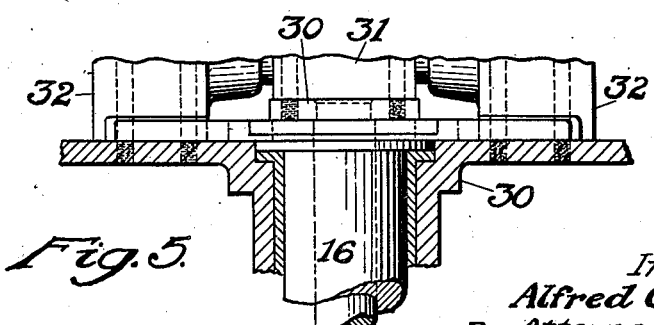
Fig. 5 is a side view of two of the pistons showing the supporting means in central sectional view.

Now if the foot pedal 43 is allowed to rise by the aid of the spring 45, the gear 40, still in mesh with the pinions 50, is moved and these, through the instrumentalities above described and shown particularly in Figs. 4 and 5, rotate the valve 38 on its own axis. The instant that it is turned so that the ports do not register exactly with the passages 37, resistance will be set up to the passage of the oil through them and the rotation of the shaft 16 will gradually increase in speed and this will be transmitted exactly to the driven shaft 23. The more the pedal is allowed to rise the more the spiral gear 40 turns the spiral pinions 50, and the greater will be the resistance. When this valve is turned so far that its ports are entirely out of mesh with the passages 37, the power will be positively transmitted to the shaft 23. The sensitive valves 70 are held closed by their springs and they open automatically when forced by the pressure outside the cylinders.

If it is desired to reverse, the brake 67 is applied and the housing 17 and member 24 retarded or stopped. This causes the rotation of the gears 19 and 20 driven by the pinion 27 to reverse the direction of rotation of the shaft 23 through internal gear 21.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. In a fluid clutch and speed change gearing, the combination with a driving shaft and a casing for a liquid secured to rotate therewith, of a shaft, cylinders fixed with respect to the last named shaft, cylinders rotatable with said casing, and pistons connected together and working in the cylinders and constituting means for transmitting the motion of rotation to the last named shaft from the first named cylinders.

2. In a fluid clutch and speed change gearing, the combination with a driving shaft and a casing for a liquid secured to rotate therewith, of a convertor shaft mounted concentrically with the driving shaft, a shaft carried by the convertor shaft eccentrically and movably bodily around with the convertor shaft, a pair of cylinders fixed with respect to the last named shaft in alignment with each other, a pair of cylinders rotatable with said casing on axes at right angles to the first named cylinders, and a cruciform member comprising four pistons fixedly connected together and working in the four cylinders and constituting means for transmitting the motion of rotation from the casing to the eccentrically located shaft.

3. In a fluid clutch, the combination with a driving shaft and a casing for lubricating oil secured to rotate therewith, of a convertor shaft mounted concentrically with the driving shaft, a shaft carried by the convertor shaft eccentrically, a pair of cylinders fixed with respect to the last named shaft, a pair of cylinders rotatable with said casing on axes at right angles to the first named cylinders, a cruciform member comprising four pistons fixedly connected together and working in the four cylinders and having longitudinal passages therethrough, and a valve carried by the cruciform member and having cross passages therethrough to permit the movement of oil freely when the valve is opened from a longitudinal passage in each piston to a longitudinal passage in the opposite piston, the valve being arranged to be turned to shut off the communication and change the speed of transmission.

4. In a fluid clutch, the combination with a driving shaft and a casing having a lubricant therein and secured to rotate therewith, of a shaft, a pair of cylinders in the casing fixed with respect to the shaft and in alignment with each other, a pair of cylinders rotatable with said casing on axes at right angles to the first named cylinders, a cruciform member comprising four pistons rigidly connected together and working with said four cylinders, a valve in the cruciform member adapted, when open, to permit the flow of liquid lubricant all the way through from the head of one cylinder to the head of the opposite cylinder, the pistons also having passages for that purpose, means for turning the valve to shut off the flow of lubricant, and automatic sensitive valves at the head of each cylinder for permitting the passage of lubricant into the cylinders when a vacuum is produced therein.

5. In a fluid clutch, the combination with a driving shaft and a casing for lubricant secured to rotate therewith, of a convertor shaft mounted concentrically with the driving shaft, a shaft carried by the convertor shaft eccentrically and movable bodily around with the convertor shaft, a cruciform construction comprising four pistons and cylinders in the casing, the pistons all being rigidly connected together and the cylinders being in two pairs, one pair movable transversely to the axis of the other pair and rotatable with the casing and the other pair rotatable with the eccentric shaft, a valve in the cruciform construction adapted, when open, to permit the flow of oil all the way through from the head of one cylinder to the head of the opposite cylinder, the pistons also having passages for that purpose, means for turning the valve to shut off the flow of oil, and automatic sensitive valves at the head of each cylinder for permitting the passage of lubricant into the cylinders when a vacuum is produced therein.

6. In a fluid clutch, the combination with a driving shaft, a casing secured to the driving shaft and adapted to be filled with a lubricating liquid, a shaft, means for supporting the last named shaft eccentrically, and means for connecting the last named shaft with a driven shaft, of a cruciform construction in the casing having four pistons fixed with respect to each other and four cylinders arranged in two opposite pairs, one pair rotatable with the casing and the other pair rotatable with the eccentrically mounted shaft, a valve for controlling the flow of the lubricating oil between these cylinders, spiral pinions, a spiral gear in mesh with the pinions, which when moved axially will turn said pinions on their own axes, means for operating the valve from said pinions, and a pedal connected with the slidable gear for operating it and controlling the clutch.

7. In a fluid clutch, the combination with a driving shaft, a convertor shaft arranged in alignment, and a casing secured to the driving shaft and adapted to be filled with a lubricating liquid, of a shaft carried by the convertor shaft but eccentric with respect thereto, rotatable on its own axis and rotatable bodily with the convertor shaft, means for connecting the last named shaft with a driven shaft for driving the latter, a cruciform construction having four pistons fixed with respect to each other and four cylinders arranged in two opposite pairs in the casing, one pair rotatable with the casing and one fixed to the eccentric shaft, a valve for controlling the flow of the lubricating liquid between these cylinders, spiral pinions connected with the valve for operating it, a spiral gear in mesh with the pinions, a slidable link, means for guiding the link to slide, means on the pinions for sliding said link back and forth, and means connected with the link for turning the valve as the link slides.

8. In a fluid clutch, the combination with a driving shaft, a convertor shaft arranged in alignment therewith, a casing secured to the driving shaft and adapted to be filled with a lubricating liquid, a shaft carried by the convertor shaft but eccentric with respect thereto, rotatable on its own axis and rotatable bodily with the convertor shaft, a set of gearing connecting the last named shaft with a driven shaft for driving the latter through said gearing, a cruciform construction having four pistons fixed with respect to each other and four cylinders arranged in two opposite pairs, one pair rotatable with the casing and one fixed to the eccentric shaft, means for controlling the flow of the lubricating liquid between these cylinders, comprising a valve, and means for operating the valve comprising spiral pinions and a spiral gear in mesh with the pinions, of a brake, comprising a brake member fixed with respect to the convertor shaft and rotatable with it, a stationary brake member adapted to be brought into contact with the first-named brake member for slowing it up.

9. In a fluid clutch, the combination with a driving shaft, a casing secured to the driving shaft and adapted to be filled with a lubricating liquid, a shaft eccentrically mounted, a cruciform construction having pistons fixed with respect to each other and relatively movable sets of cylinders, and means for controlling the flow of the lubricating oil between said cylinders, of a brake, comprising a brake member fixed with respect to the second-named shaft and rotatable with it, a stationary brake member adapted to be brought into contact with the first-named brake member for slowing it up, and gearing between the shaft carried by the second-named shaft and the driven shaft arranged to reverse the driven shaft when the brake is applied.

10. The combination with a driving shaft, a casing secured to the driving shaft and adapted to be filled with a lubricating liquid, a shaft, pistons and cylinders connected with the second shaft and casing to drive the second shaft, and means for controlling the flow of the lubricating oil between said cylinders, of a brake, comprising a brake member fixed with respect to the second-named shaft and rotatable with it, a stationary brake member adapted to be brought into contact with the first-named brake member for slowing it down and thus slowing down the second shaft, a driven shaft and reversing gearing between the second-named shaft and the driven shaft.

In testimony whereof I have hereunto affixed my signature.

ALFRED C. ANDERSON.